Feb. 27, 1940.  E. F. ZAP  2,191,840
AERODYNAMIC CONTROL DEVICE
Filed Dec. 22, 1937
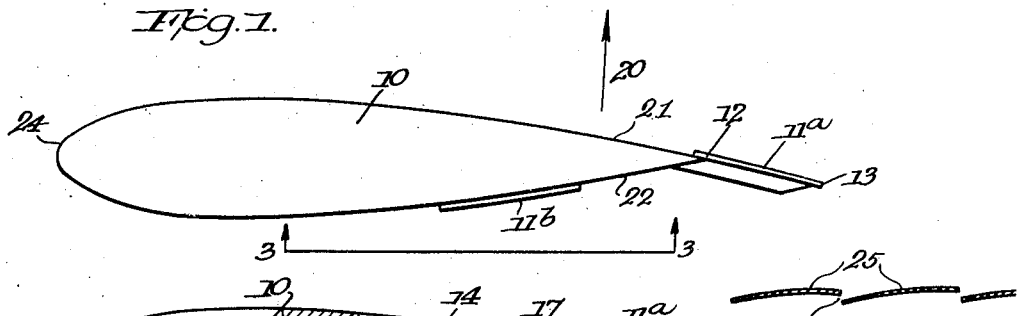
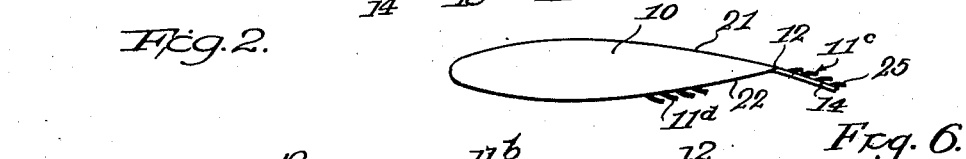
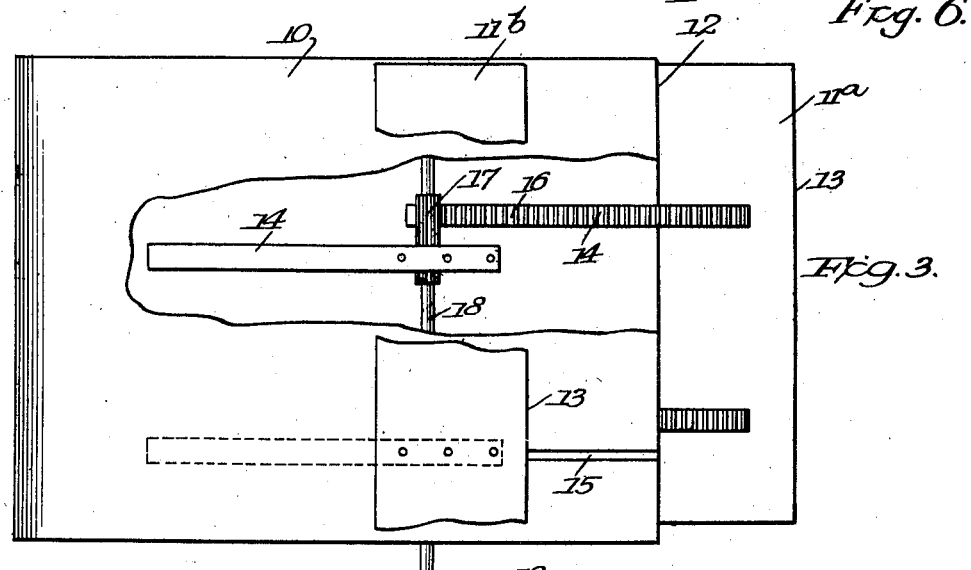
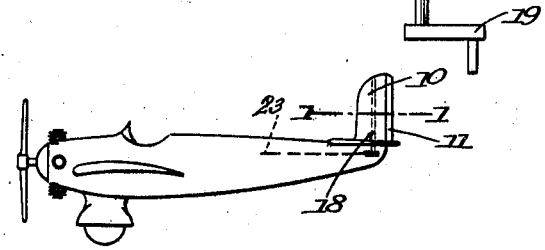
Edward F. Zap,
INVENTOR.
BY
ATTORNEY Patented Feb. 27, 1940

2,191,840

UNITED STATES PATENT OFFICE 2,191,840

AERODYNAMIC CONTROL DEVICE

Edward F. Zap, West Chester, Pa.

Application December 22, 1937, Serial No. 181,215

5 Claims. (Cl. 244—75)

The invention relates to the steering of aircraft, particularly of large units, such as multi-passenger airplanes and dirigibles. Their large conventional ailerons, elevators, and rudders require excessively heavy control gearings and excessive control forces on the control wheel.

It is an object of my invention to substitute for such conventional control devices novel ones requiring lighter control gears and smaller control forces; having furthermore a small air resistance and a large efficiency.

It is a further object of my invention to provide for such aerodynamic control devices, larger control displacements of which are associated with a larger gear ratio between displacement changes and control force changes than smaller ones are.

It is a further object to provide for such aerodynamic control devices having a larger control gear ratio for control forces acting in the same direction as an initial aerodynamic force than for control forces acting oppositely thereto.

This is obtained by the use of comparatively thick control airfoils, such as wing tips, stabilizers, or fins, having a sharp trailing edge formed of a pair of substantially circularly contoured surface portions. Adjacent these surfaces, preferably on their outside and in full intimate gliding contact therewith, are mounted at least two thin slidable panels, slotted in the larger units, one at each side, their trailing edges when in neutral being adjacent the trailing edge of the stationary control airfoil. For creating the control force, either the one or the other of said panels is shifted rearwardly beyond the trailing edge of the airfoil into the smooth and continuous extension of its airfoil surface. The area of the airfoil is thereby increased, the curvature of the composite mean camber line is modified, and the effective angle of attack of the composite wing section is changed, all of which contributes towards the creation of the desired control air force.

These and other desirable objects and advantages of the present invention will be illustrated in the accompanying drawing and described in the specification, certain preferred embodiments being disclosed by way of illustration only, for, since the underlying principles may be incorporated in other specific devices, it is not intended to be limited to the ones here shown, except as such limitations are clearly imposed by the appended claims.

In the drawing, like numerals refer to similar parts throughout the several views, of which—

Fig. 1 represents the horizontal contour of a vertical airplane fin on the line 1—1 of Fig. 4, showing the control in extreme displacement;

Fig. 2 is a corresponding cross-section through the fin on the same line 1—1, showing the controls in neutral and the control mechanism;

Fig. 3 is a sectional elevational view of the same fin as indicated by the line and arrows 3—3;

Fig. 4 is the schematic side view of a conventional airplane, having the invention incorporated in the fin;

Fig. 5 represents a cross-section through a panel 11 of Fig. 1 but modified, the panel being slotted; and Fig. 6 shows the complete contour of the control device having a slotted panel.

Two thin sheet metal panels 11a and 11b are in intimate outside contact with and slidably mounted on the rear portion of the right and left surface 21 and 22 of a fin 10, the direction of sliding motion being substantially at right angles to its sharp trailing edge 12.

In Fig. 2, panels 11a and 11b are shown in neutral position. The trailing edges 13 of the panels are then adjacent the trailing edge 12 of the control airfoil or fin 12.

In Fig. 1, the same panels are shown in extreme control position. Panel 11a is moved backwardly behind the trailing edge 12 of the fin, occupying the smooth and unbroken continuation of the surface 21 of the fin. At the other extreme control position, not shown, panel 11b would occupy an exactly corresponding continuation or extension of lower surface 22. These two extensions or paths of the panels 11a and 11b intersect with each other along the trailing edge 12.

The panels 11a and 11b are fastened to and held by battens 14 within the fin slidably supported by the fin structure, and connected to the panels by structural members reaching through slots 15 in the fin surface. These battens 14 are provided with rack gears 16, facing the inside of the fin, and in mesh with pinions 17 of a control shaft 18 mounted within the fin on the fin structure. This shaft can be turned by any conventional control transmission means, manual or energized, mechanical, electrical, or hydraulic under the control of the pilot, as schematically indicated by the hand crank 19 and a transmission chain 23.

If shaft 17 is turned from its neutral position of Fig. 2, say in a right hand direction as drawn, panels 11a and 11b slide into the positions of Fig. 1. The wing area of the composite fin is thereby increased by the area of the panel, which is shown to be materially smaller than the fin area, in that the chord length of the panel, about the distance from 12 to 13 in Fig. 1, is substantially smaller than the chord length of the fin, about the distance from 24 to 12, 24 designating the leading edge of the fin and 12 its trailing edge. The new composite wing section, Fig. 1 or Fig. 6, has now furthermore a mean downwardly hollow camber, 11a being now similar to a downwardly turned flap, and a rearwardly and downwardly inclined average camber line. An aerodynamic control force is consequently created substantially in direction of arrow 20. An opposite turning of control shaft 17 from neutral would have created a substantially opposite control force in an exactly equivalent manner.

The solid or one-piece panels 11a and 11b are preferred for comparatively small units. For really large ones, it is preferred to subdivide the panels into strips 25 separated from each other by slots 26; the strips 25 being so arranged relative to each other that a flow of the air from the pressure side to the suction side is invited. In Figs. 5 and 6, the pressure side is on bottom, and the suction side on top. Strips 25 are fastened rigidly to battens 14, and are displaced in unison as a unitary structure 11c or 11d in exactly the same way as described with the solid panel. The complete plurality of strips 25 is considered one panel 11c or 11d, namely a grill or a slotted panel. Strips 25 are shown to be bent of a single strip of sheet metal. They could also be profiled with variable thickness. The solid panel 11a or 11b, likewise, although shown flat, may also be made with variable thickness.

If the airplane flies straight ahead, the angle of attack of the fin is zero, and there is no initial aerodynamic force with a neutral control position. There is full symmetry to right and left, and accordingly the control effect is also symmetrical to both sides.

If the control airfoil has a positive angle of attack with neutral control position, as may occur with the horizontal stabilizer and with the wing tips, this initial unsymmetry would become apparent in the control effects of the two panels. The panel on the original suction side would produce a larger control force than the panel on the suction side, the two panels being supposed to be equally displaced from neutral. Thus, under ordinary conditions, there would be a natural differential effect of the lateral or wing tip control device, in that the upwardly directed wing tip control force would exceed the downwardly directed wing top control force for equal displacement of one upper and one lower panel.

I claim:

1. In an aircraft, means for steering the same including a stationary thick airfoil, a first thin panel adjacent the rear and in gliding contact with one side of the airfoil and mounted for fore-and-aft movement beyond the trailing edge of the airfoil along a first predetermined path, a second thin panel adjacent the rear and in gliding contact with the other side of the airfoil and mounted for fore-and-aft movement beyond the trailing edge of the airfoil along a second predetermined path, said two paths intersecting with each other in rear of the airfoil, and unitary control means in engagement with the two panels for selectively shifting either the first or the second panel along its predetermined path.

2. In an aircraft, means for steering the same including a stationary thick airfoil, a first evenly curved wall portion adjacent to the rear of and on one side of the airfoil, a first thin panel shaped to conform to said first wall portion and in contact therewith throughout, and mounted for fore-and-aft movement beyond the trailing edge of the airfoil along a first predetermined path, a second evenly curved wall portion adjacent the rear of and on the other side of the airfoil, a second thin panel shaped to conform to said second wall portion and in contact therewith throughout, and mounted for fore-and-aft movement beyond the trailing edge of the airfoil along a second predetermined path, said two paths intersecting with each other in rear of the airfoil, and unitary control means in engagement with the two panels for selectively shifting either the first or the second panel along its predetermined path.

3. In an aircraft, means for steering the same including a stationary thick airfoil, a first thin slotted panel adjacent the rear and in gliding contact with one side of the airfoil and mounted for fore-and-aft movement beyond the trailing edge of the airfoil along a first predetermined path, a second thin slotted panel adjacent the rear and in gliding contact with the other side of the airfoil and mounted for fore-and-aft movement beyond the trailing edge of the airfoil along a second predetermined path, said two paths intersecting with each other in rear of the airfoil, and unitary control means in engagement with the two panels for selectively shifting either the first or the second panel along its predetermined path.

4. In an aircraft, means for steering the same including a stationary thick airfoil, a first evenly curved wall portion adjacent the rear of and on one side of the airfoil, a first thin slotted panel shaped to conform to said first wall portion and in contact therewith throughout, and mounted for fore-and-aft movement beyond the trailing edge of the airfoil along a first predetermined path, a second evenly curved wall portion adjacent the rear of and on the other side of the airfoil, a second thin slotted panel shaped to conform to said second wall portion and in contact therewith throughout, mounted for fore-and-aft movement beyond the trailing edge of the airfoil along a second predetermined path, said two paths intersecting with each other in rear of the airfoil, and unitary control means in engagement with the two panels for selectively shifting either the first or the second panel along its predetermined path.

5. In a steering means for aircraft, a stationary thick control airfoil having two rearwardly disposed uniformly curved surface portions intersecting with each other at the trailing edge of the airfoil, a pair of thin control panels, one in gliding contact with one of said surface portions and the other panel in gliding contact with the other of said surface portions, slidable battens within said airfoil in a substantially chordwise direction parallel to said surface portions fastened to said panels and supported by the airfoil, rack gears on said battens, a shaft mounted in the airfoil, pinions on said shaft in mesh with said rack gears, and control means for turning the shaft in either direction so arranged and constructed that the rotation of the shaft is associated with a shifting of one of the panels rearwardly and of the other forwardly.

EDWARD F. ZAP.